United States Patent

Nakamichi

[15] 3,690,535

[45] Sept. 12, 1972

[54] TAPE GUIDE DEVICE OF A TAPE RECORDER

[72] Inventor: Niro Nakamichi, Tokyo, Japan

[73] Assignee: Nakamichi Research Incorporated

[22] Filed: Nov. 30, 1970

[21] Appl. No.: 93,656

[30] Foreign Application Priority Data

Dec. 6, 1969 Japan ....................44/116181

[52] U.S. Cl....................................226/190, 226/196

[51] Int. Cl. ............................................B65h 17/20

[58] Field of Search......................226/196–199, 190, 226/194; 221/70–73; 242/76

[56] References Cited

UNITED STATES PATENTS

| | | | |
|---|---|---|---|
| 3,420,463 | 1/1969 | Cousino | 226/190 X |
| 3,537,661 | 11/1970 | Isom | 226/194 X |
| 3,547,372 | 12/1970 | Barnett | 226/190 X |

*Primary Examiner*—Allen N. Knowles
*Assistant Examiner*—Gene A. Church
*Attorney*—Clario Ceccon

[57] ABSTRACT

This invention relates to the tape guide device of a tape recorder; wherein the pinch roller is provided with two channels in its side face, the distance between said two channels being wider rather than the width of the magnetic tape, projections of said guide plate are put in said channels and the top ends of said projections keep the magnetic tape in the normal position during operation. The guide plate for the magnetic tape can be arranged in a narrow space because the projections of the guide plate are put in the channels of the pinch roller.

5 Claims, 5 Drawing Figures

PATENTED SEP 12 1972

3,690,535

Niro Nakamichi INVENTOR.

BY

[signature], agent

TAPE GUIDE DEVICE OF A TAPE RECORDER

This invention relates to a tape recorder, particularly to a tape guide device of a tape recorder.

Generally, in a tape recorder, a magnetic tape is pressed between a pinch roller and a drive roller which is rotated at a constant speed by a motor. If the axis of the drive roller and that of the pinch roller are not parallel with each other, or if the pinch roller is distorted, the magnetic tape cannot be uniformly held between them, and hence a force is applied to the magnetic tape in its traverse direction a so-called skew phenomena occurs so that the magnetic tape is deviated from its normal position. For an improvement, it was proposed to dispose a tape guide device in the neighborhood of the drive roller, but it is difficult to dispose said device in a small tape recorder such as cassette tape recorder because there is only small space in the neighborhood of the pinch roller and the drive roller.

Therefore, it is an object of this invention to provide a tape guide device which needs only small space.

It is another object of this invention to provide a tape guide device bywhich the traverse displacement of a magnetic tape is effectively prevented.

According to this invention, a pinch roller is provided with channels a little wider than a magnetic tape, and a projection is disposed in each channel, said projection being not attached to said channel and extended beyond the running line of the magnetic tape so that the position of the tape is controlled by the top ends of the projections.

This invention will be more fully understood by the following description with reference to the drawing, in which.

Figure 1:
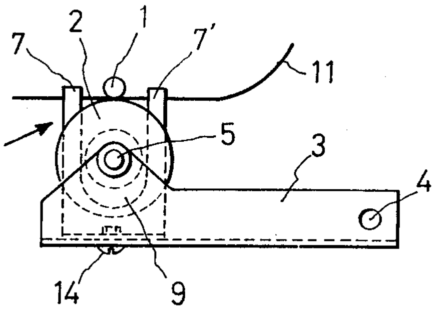
FIG. 1 is a plan view of an embodiment of the tape guide device of the tape recorder of this invention.
Figure 4A:
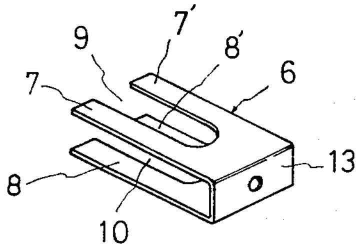
Figure 4B:
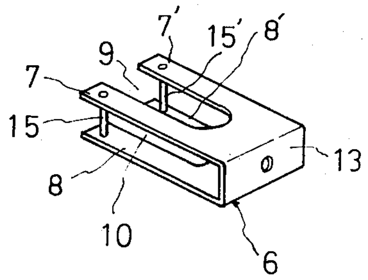

FIG. 4*a* is a perspective view of a guide plate used in the device of FIG. 1; and FIG. 4*b* is a perspective view of a modified guide plate.

Figure 2:
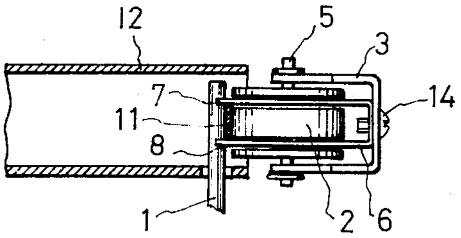
FIG. 2 is a partially cross-sectional side view of the device of FIG. 1.

In FIGS. 1 and 2, a magnetic tape 11 is pressed between a drive roller 1 and a pinch roller 2, and said magnetic tape runs simultaneously as the drive roller 1 rotates. The pinch roller 2 is supported rotably by a shaft 5 fixed to a pinch roller arm 3 which can rotate around a shaft 4 and can be moved into and out of contact with the drive roller 1 in response to the state of operation.

Figure 3:
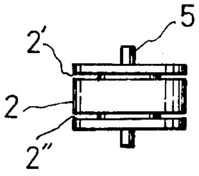
FIG. 3 is a side view of the pinch roller of the device of FIG. 1.

As shown in FIG. 3, the pinch roller 2 is provided with channels 2′ and 2″ in its side face, the distance between channels 2′ and 2″ being a little wider than the width of the magnetic tape, and the width and depth of channels 2′ and 2″ being determined so as that they are clear of to projections 7, 7′, 8 and 8′ of a guide plate 6.

The guide plate 6 is formed as shown in FIG. 4*a*, its upper and lower plates are opposite to each other, these plates are cut as fork-like shape so that the projections 7, 7′, 8 and 8′ are arranged at both sides of cut-off parts 9 and 10. The gap between upper and lower projections 7 and 8, or between 7′ and 8′, is generally the same as the distance between centers of channels 2′ and 2″, the width between cut-off parts 9 and 10 is rather larger than the diameter of channels 2′ and 2″ at their bottoms, and the thickness of the projections 7, 7′, 8 and 8′ is thinner than the width of channels 2′ and 2″.

The side plate 13 of the guide plate 6 is fixed to the pinch roller arm 3 by a screw 14 so that a part of each projection is put in channels 2′ and 2″. Each projection is extended beyond the running line of the magnetic tape. As shown in FIG. 2, the magnetic tape is conventionally accommodated in a cassette case 12.

When the magnetic tape 11 is running, the pinch roller arm 3 is turned to press the roller 2 to the drive roller 1, and the magnetic tape 11 is held between them to be driven. Thus, the magnetic tape 11 is guided by projections 7, 8, 7′ and 8′ of the guide plate 6 and keeps running in its normal position. Although two sets of members 7–8 and 7′–8′ are used in the above embodiment, either one set of them is sufficient for guiding the magnetic tape.

Further more, when magnetic tape 11 contact rather large part with pinch roller 2, a force applied to width direction of magnetic tape 11 is larger and so contact part of magnetic tape 11 with pinch roller 2 decrease, guide rods 15 and 15′ are set between projections 7 and 8 and between projections 7′ and 8′, respectively, as shown in FIG. 4*b*. These guide rods 15 and 15′ prevent the magnetic tape 11 from displacing to touch with the pinch roller 2 at an abnormal position. If a back tension applied to the magnetic tape 11 or a friction between the magnetic tape 11 and the pinch roller 2 is large, if the pinch roller 2 is slightly slanted and if the magnetic tape 11 touches the pinch roller 2 at an abnormal state, the magnetic tape 11 is subjected to a large force in the direction of its width, the thin magnetic tape may be bent by the contact with the projections 7, 7′, 8 and 8′ thus be broken. Such defects are diminished by the guides 15 and 15′. Accordingly, the magnetic tape 11 is guided by the guide rods 15 and 15′ and the rods should be made of metals, glass or plastics which have low coefficient of friction are not worn out.

As above-described, according to this invention, the guide plate 6 can be disposed in a narrow space between the drive roller 1 and the pinch roller 2, the projections 7, 7′, 8 and 8′ of the guide plate 6 are disposed in the both sides of the part where the drive roller 1 and the pinch roller 2 contact each other, the magnetic tape can be kept in a normal state and eliminate a so-called skew phenomena whether tape runs forward or backward, and hence this invention has a great advantage especially when applied to a reversible tape recorder. The parts of the pinch roller 2 outside of the channels 2 and 2′ are directly pressed to the drive roller and the magnetic tape can be efficiently driven.

What is claimed is:

1. Tape guide device for a tape recorder in which the tape is pressed between a drive roller and a pinch roller, comprising in combination a pinch roller having a pair of circumferential channels axially spaced apart slightly more than the width of the tape, and guide means having a pair of projections respectively disposed to respectively enter said channels with a slight clearance, whereby said projections in said channels prevent transverse displacement of the tape pressed between said rollers.

2. Tape guide device as claimed in claim 1, in which said guide means comprises a plate having said projections carried thereby.

3. Tape guide device as claimed in claim 1, in which said guide means and pinch roller are pivoted on an axis parallel to the axes of said rollers but spaced therefrom to permit said pinch roller and guide projections to move toward and away from said drive roller.

4. Tape guide device as claimed in claim 1, in which spacer means are mounted between said projections to prevent the tape from engaging the pinch roller at an abnormal position.

5. Tape guide device as claimed in claim 4, in which said spacer means are guide rods, and said projections are edges of portions of said plate.

* * * * *